(12) United States Patent
Hirose (10) Patent No.: US 10,021,211 B2
(45) Date of Patent: Jul. 10, 2018

(54) ESTIMATION OF MISSED INFORMATION

(71) Applicant: Empire Technology Development LLC, Wilmington, DE (US)

(72) Inventor: Haruto Hirose, Yokohama (JP)

(73) Assignee: Empire Technology Development LLC, Wilmington, DE (US)

( * ) Notice: Subject to any disclaimer, the term of this patent is extended or adjusted under 35 U.S.C. 154(b) by 407 days.

(21) Appl. No.: 14/346,855

(22) PCT Filed: May 10, 2013

(86) PCT No.: PCT/US2013/040574
§ 371 (c)(1),
(2) Date: Mar. 24, 2014

(87) PCT Pub. No.: WO2014/182313
PCT Pub. Date: Nov. 13, 2014

(65) Prior Publication Data
US 2015/0296038 A1    Oct. 15, 2015

(51) Int. Cl.
*G06F 15/16*    (2006.01)
*H04L 29/08*    (2006.01)

(52) U.S. Cl.
CPC ............ *H04L 67/288* (2013.01); *H04L 67/10* (2013.01); *H04L 67/2861* (2013.01)

(58) Field of Classification Search
CPC .... H04L 67/288; H04L 67/10; H04L 67/2861
See application file for complete search history.

(56) References Cited

U.S. PATENT DOCUMENTS

| 5,564,070 | A | 10/1996 | Want et al. |
| 8,060,074 | B2 | 11/2011 | Danford et al. |
| 2002/0098840 | A1* | 7/2002 | Hanson ................... H04L 67/40 455/435.3 |
| 2007/0094712 | A1 | 4/2007 | Gibbs et al. |
| 2007/0253413 | A1* | 11/2007 | Citron ..................... H04L 12/24 370/389 |
| 2009/0024750 | A1 | 1/2009 | Overby, Jr. et al. |
| 2011/0256894 | A1* | 10/2011 | Khandelia ......... H04W 36/0083 455/507 |
| 2011/0264731 | A1 | 10/2011 | Knowles et al. |

(Continued)

FOREIGN PATENT DOCUMENTS

| WO | 0019682 A1 | 4/2000 |
| WO | 2012042509 A1 | 4/2012 |

OTHER PUBLICATIONS

International Search Report with Written Opinion for International Application No. PCT/US2013/040574 dated Dec. 2, 2013.

*Primary Examiner* — June Sison
*Assistant Examiner* — Steven Nguyen
(74) *Attorney, Agent, or Firm* — IP Spring (57) ABSTRACT

A method performed under control of a cloud system including a first proxy terminal may include connecting the first proxy terminal with a first end device, receiving, from the first end device, a first information regarding the first end device, and estimating a second information regarding the first end device based at least in part on the first information regarding the first end device. The estimating is performed when the first end device is disconnected from the first proxy terminal.

15 Claims, 9 Drawing Sheets

(56) References Cited

U.S. PATENT DOCUMENTS

| | | | |
|---|---|---|---|
| 2011/0307171 A1* | 12/2011 | Waite | G01C 21/30 |
| | | | 701/421 |
| 2012/0157121 A1* | 6/2012 | Li | G01S 5/0018 |
| | | | 455/456.2 |
| 2012/0185693 A1 | 7/2012 | Chen et al. | |
| 2012/0210389 A1 | 8/2012 | Brown et al. | |
| 2012/0271684 A1 | 10/2012 | Shutter | |
| 2013/0045759 A1* | 2/2013 | Smith | H04W 64/00 |
| | | | 455/456.6 |
| 2013/0111038 A1* | 5/2013 | Girard | H04L 69/16 |
| | | | 709/226 |
| 2013/0207949 A1* | 8/2013 | Jiang | G09G 3/36 |
| | | | 345/207 |
| 2013/0297198 A1* | 11/2013 | Vande Velde | G01C 21/28 |
| | | | 701/409 |

* cited by examiner

ESTIMATION OF MISSED INFORMATION

CROSS-REFERENCE TO RELATED APPLICATION

This Application is the U.S. National Stage filing under 35 U.S.C. § 371 of International Application No. PCT/US13/40574, filed on May 10, 2013. The disclosure of the International Application is incorporated by reference in its entirety.

BACKGROUND

Cloud computing refers to a supplement, consumption, and delivery model for Internet-based IT services. Cloud computing provides a user with computing resources over the Internet anytime, anywhere. Examples of cloud computing resources include a central processing unit (CPU), capacity, memory, storage, development platforms, application programs, and the like. Recently, cloud computing service providers are paying more and more attention how to more efficiently provide cloud computing service to end users.

SUMMARY

In an example, a method performed under control of a cloud system including a first proxy terminal may include: connecting the first proxy terminal with a first end device; receiving, from the first end device, a first information regarding the first end device; and estimating a second information regarding the first end device based at least in part on the first information regarding the first end device. The estimating is performed when the first end device is disconnected from the first proxy terminal.

In another example, a proxy terminal included in a cloud system may include: a communication unit configured to connect to an end device; a receiving unit configured to receive, from the end device, a first information regarding the end device; and a database configured to store the first information regarding the end device and a second information regarding the end device. The second information regarding the end device is estimated based at least in part on the first information regarding the end device when the end device is disconnected from the proxy terminal.

In yet another example, a method performed under control of an end device may include: connecting to a proxy terminal included in a cloud system, transmitting a device information to the proxy terminal while connecting to the proxy terminal, determining whether the end device moves out of a connection area of the proxy terminal, and disconnecting from the proxy terminal if the end device moves out of the connection area of the proxy terminal. The device information includes at least one of a global positioning system (GPS) information of the end device, a network usage information of the end device and a device usage information of the end device.

In yet another example, an end device may include: a connection unit configured to connect to a proxy terminal included in a cloud system, a transmitting unit configured to transmit a device information to the proxy terminal while connecting to the proxy terminal, and a determination unit configured to determine whether the end device moves out of a connection area of the proxy terminal. The connection unit is further configured to disconnect from the proxy terminal if the determination unit determines that the end device moves out of the connection area of the proxy terminal, and the device information includes at least one of a global positioning system (GPS) information of the end device, a network usage information of the end device and a device usage information of the end device.

In yet another example, a computer-readable storage medium may store thereon computer-executable instructions that, in response to execution, cause a cloud system including a first proxy terminal to perform operations including connecting the first proxy terminal with a first end device; receiving, from the first end device, a first information regarding the first end device; and estimating a second information regarding the first end device based at least in part on the first information regarding the first end device. The estimating is performed when the first end device is disconnected from the first proxy terminal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to estimating missed information regarding an end device. Technologies are generally described for a cloud system that includes a proxy terminal and estimates missed information regarding an end device connected with the proxy terminal.

In some examples, a cloud system may include a proxy terminal. The proxy terminal may be connected with a network provider which provides a communication network. An end device may be connected with the cloud system, and specifically with the proxy terminal included in the cloud system. Thus, the end device may be connected to the communication network through the proxy terminal. While the end device is being connected to the proxy terminal, the end device may transmit information regarding the end device, such as a global positioning system (GPS) information of the end device to the proxy terminal. The proxy terminal included in the cloud system may receive the information and store the received information in its own database. However, if the end device is disconnected from the proxy terminal (e.g., the end device may be positioned outside of the network service area), the end device may not transmit information regarding the end device to the proxy terminal, and the cloud system may not obtain the end device information (i.e., the cloud system may miss the end device information, such as the present GPS information of the end device). In such cases, the cloud system may estimate the missed end device information based on the previously stored information (i.e., the cloud system may estimate the present GPS information of the end device based on the past GPS information stored in the database).

Figure 1A:
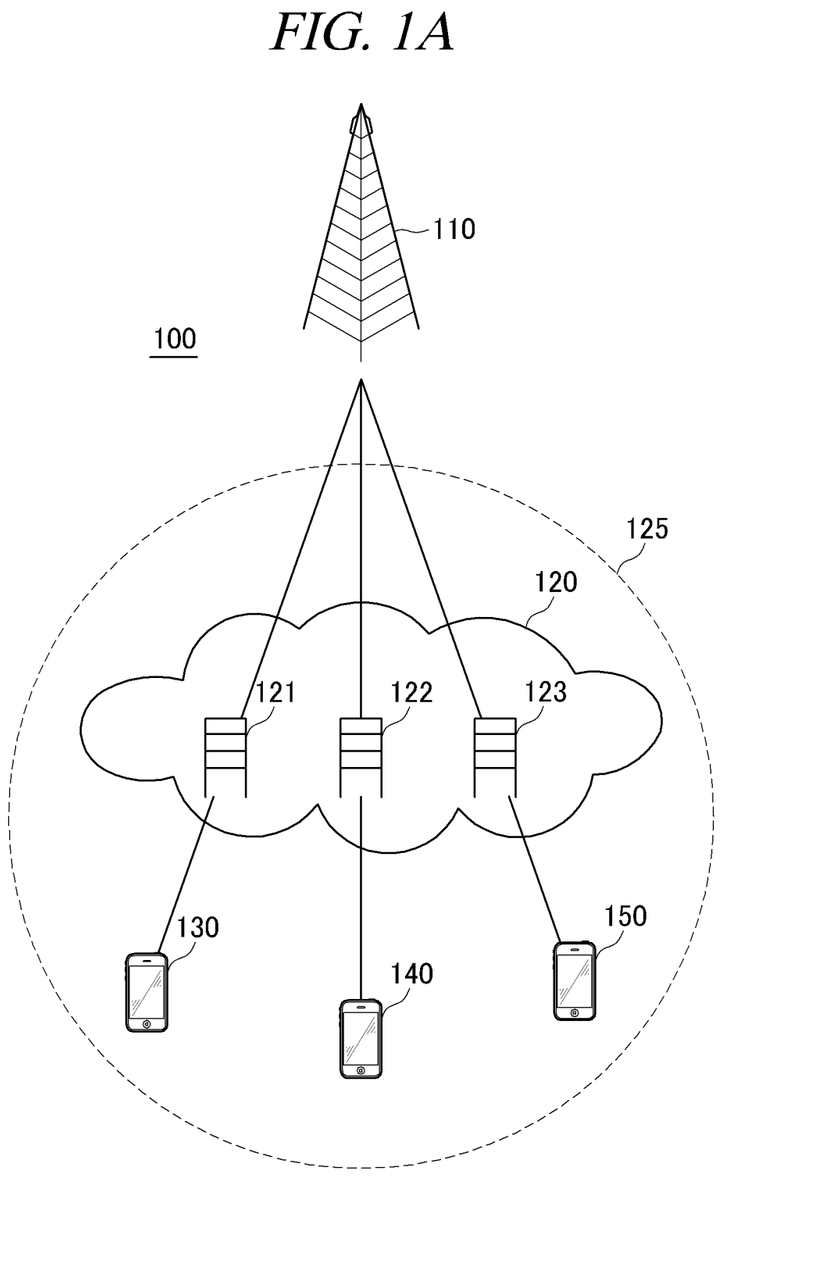
FIGS. 1A and 1B schematically show illustrative examples of a network communication environment including a network provider, a cloud system including proxy terminals, a first end device, a second end device and a third end device, arranged in accordance with at least some embodiments described herein.
Figure 1B:
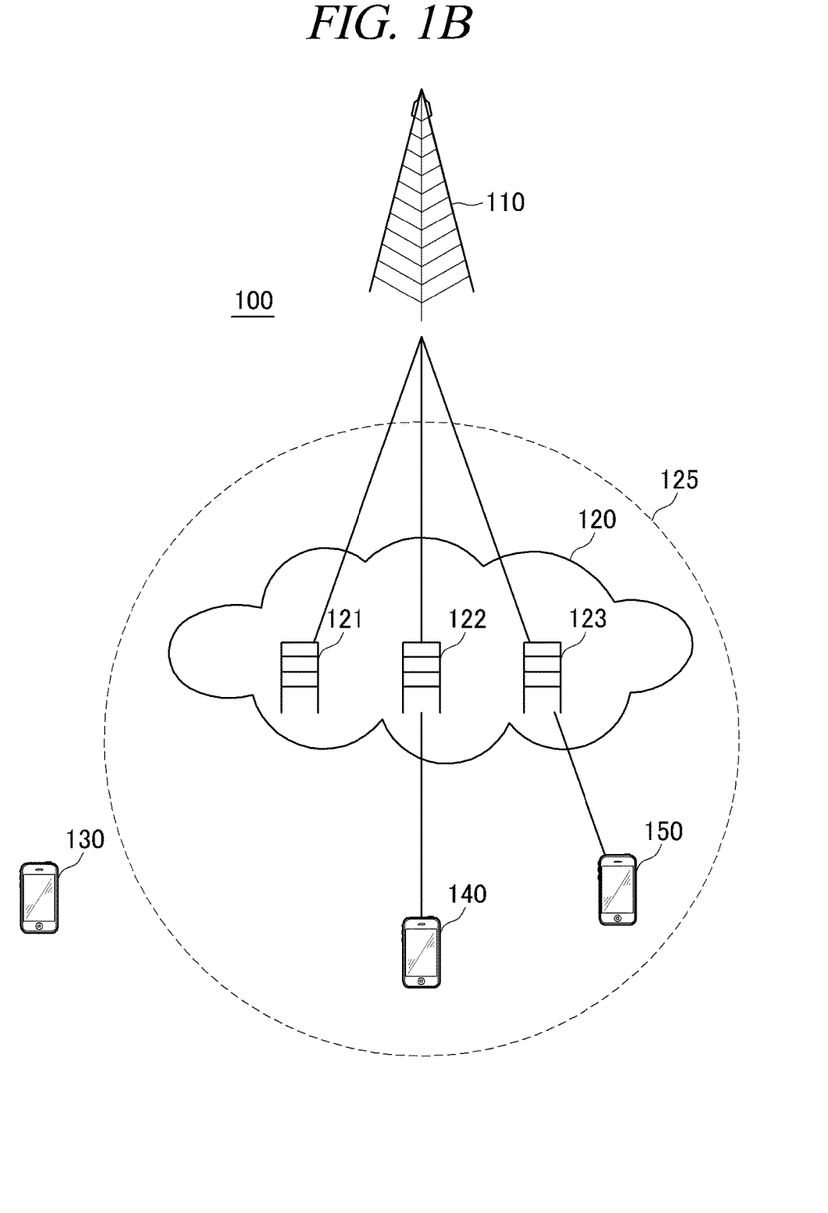

FIGS. 1A and 1B schematically show illustrative examples of a network communication environment 100 including a network provider 110, a cloud system 120 including proxy terminals 121, 122, 123, a first end device 130, a second end device 140 and a third end device 150, arranged in accordance with at least some embodiments described herein. By way of examples, but not limitation, network provider 110 may include at least one of a web server that provides an internet website, an access point that provides a wireless local area network such as a Wi-Fi network, or a mobile operating server that provides a mobile telecommunications network including a 3rd generation (3G) mobile telecommunications network, a 4th generation (4G) mobile telecommunications network, and any other mobile telecommunications networks.

Further, by way of example, but not limitation, first end device 130, second end device 140 and third end device 150 may respectively include a personal communication terminal, such as PCS (Personal Communication System), GMS (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

In the example illustrated in FIGS. 1A and 1B, it may be assumed that three proxy terminals 121, 122, 123 are included in cloud system 120 and three end device 130, 140, 150 are located around cloud system 120. However, one skilled in the art will appreciate that any number of proxy terminals can be included in cloud system 120 and any number of end devices can be located around cloud system 120.

As illustrated in FIG. 1A, first proxy terminal 121, second proxy terminal 122 and third proxy terminal 123 may be connected to network provider 110. By way of example, but not limitation, first proxy terminal 121, second proxy terminal 122 and third proxy terminal 123 may be connected each other via a wireless local area network in cloud system 120.

In some embodiments, first end device 130, second end device 140 and third end device 150 may be located in a connecting area 125 of cloud system 120. First end device 130 may transmit, to first proxy terminal 121 included in cloud system 120, a request for connecting to first proxy terminal 121. Second end device 140 may transmit, to second proxy terminal 122, a request for connecting to second proxy terminal 122. Third end device 150 may transmit, to third proxy terminal 123, a request for connecting to second proxy terminal 123.

First proxy terminal 121, second proxy terminal 122 and third proxy terminal 123 may respectively receive the connecting request from first end device 130, second end device 140 and third end device 150.

First end device 130 may connect to first proxy terminal 121, second end device 140 may connect to second proxy terminal 122 and third end device 150 may connect to third proxy terminal 123. There may be a one-to-one correspondence between each of end devices 130, 140 and 150 and each of proxy terminals 121, 122 and 123.

First end device 130 may be connected to a network such as a wireless local area network (e.g., a Wi-Fi network) or an Internet provided by network provider 110 via first proxy terminal 121 included in cloud system 120. Further, second end device 140 and third end device 150 may be connected to the network provided by network provider 110 via second proxy terminal 122 and third proxy terminal 123, respectively.

In some embodiments, first end device 130 may transmit first information regarding first end device 130 to first proxy terminal 121 included in cloud system 120 while first end device 130 is being connected to first proxy terminal 121. By way of example, but not limitation, the first information regarding first end device 130 may include at least one of a global positioning system (GPS) information of first end device 130, a network usage information of first end device 130 and a device usage information of first end device 130. By way of example, but not limitation, the network usage information of first end device 130 may include Uniform Resource Locator (URL) or Internet Protocol (IP) address of a website to which first end device 130 accesses, and Internet Protocol (IP) address of another end device with which first end device 130 communicates through a network. By way of example, but not limitation, the device usage information of first end device 130 may include an acceleration sensor data of first end device 130, liquid crystal brightness values of first end device 130, and camera usage record of first end device 130.

Further, second end device 140 may transmit first information regarding second end device 140 to second proxy terminal 122 included in cloud system 120 while second end device 140 is being connected to second proxy terminal 122. By way of example, but not limitation, the first information regarding second end device 140 may include at least one of a global positioning system (GPS) information of second end device 140, a network usage information of second end device 140 and a device usage information of second end device 140. By way of example, but not limitation, the network usage information of second end device 140 may include Uniform Resource Locator (URL) or Internet Protocol (IP) address of a website to which second end device 140 accesses, and Internet Protocol (IP) address of another end device with which second end device 140 communicates through a network. By way of example, but not limitation, the device usage information of second end device 140 may include an acceleration sensor data of second end device 140, liquid crystal brightness values of second end device 140, and camera usage record of second end device 140.

In some embodiments, first proxy terminal 121 may receive, from first end device 130, the first information regarding first end device 130, and second proxy terminal 122 may receive, from second end device 140, the first information regarding second end device 130. Similarly, third end device 150 may transmit first information regarding third end device 150 to third proxy terminal 123, and third proxy terminal 123 may receive the first information regarding third end device 150.

In some embodiments, first proxy terminal 121 may store the received first information regarding first end device 130 in a database of first proxy terminal 121. Second proxy terminal 122 may store the received first information regarding second end device 140 in a database of second proxy terminal 122, and third proxy terminal 123 may store the received first information regarding third end device 150 in a database of third proxy terminal 123.

As illustrated in FIG. 1B, if first end device 130 moves out of connecting area 125 of cloud system 120, first end device 130 may be disconnected from first proxy terminal 121 included in cloud system 120. Accordingly, first proxy terminal 121 may not receive the first information regarding first end device 130, and thus, first proxy terminal 121 may miss the first information regarding first end device 130.

In some embodiments, if first end device 130 is disconnected from first proxy terminal 121, first proxy terminal 121 may estimate second information regarding first end device 130 (which may be information of first end device 130 during the disconnection) based on the previously stored first information regarding first end device 130. That is, first proxy terminal 121 may estimate the missed information regarding first end device 130 based on the previously stored device information regarding first end device 130. By way of example, but not limitation, if first end device 130 is disconnected from first proxy terminal 121, first proxy terminal 121 may predict a location in which first end device 130 is located and estimate the present global positioning system (GPS) information of first end device 130 based on the previously stored GPS information of first end device 130.

In some embodiments, if first end device 130 is disconnected from first proxy terminal 121, first proxy terminal 121 may estimate the second information regarding first end device 130 based on the previously stored first information regarding first end device 130 and at least one of the first information regarding second device 140 and the first information regarding third device 150. First proxy terminal 121, second proxy terminal 122 and third proxy terminal 123 may share the first information regarding first end device 130, first information regarding second device 140 and the first information regarding third device 150, which are stored in its own database.

By way of example, but not limitation, first proxy terminal 121 may receive, from second proxy terminal 122, the first information regarding second device 140 indicating that a camera of second end device 140 is used around the predicted location of first end device 130. As described above, if first end device 130 is disconnected from first proxy terminal 121, first proxy terminal 121 may predict the location in which first end device 130 is located based on the previously stored GPS information of first end device 130. Further, based on the received first information regarding second device 140, first proxy terminal 121 may presume that a camera of first end device 130 is also used around the predicted location of first end device 130.

Figure 2:
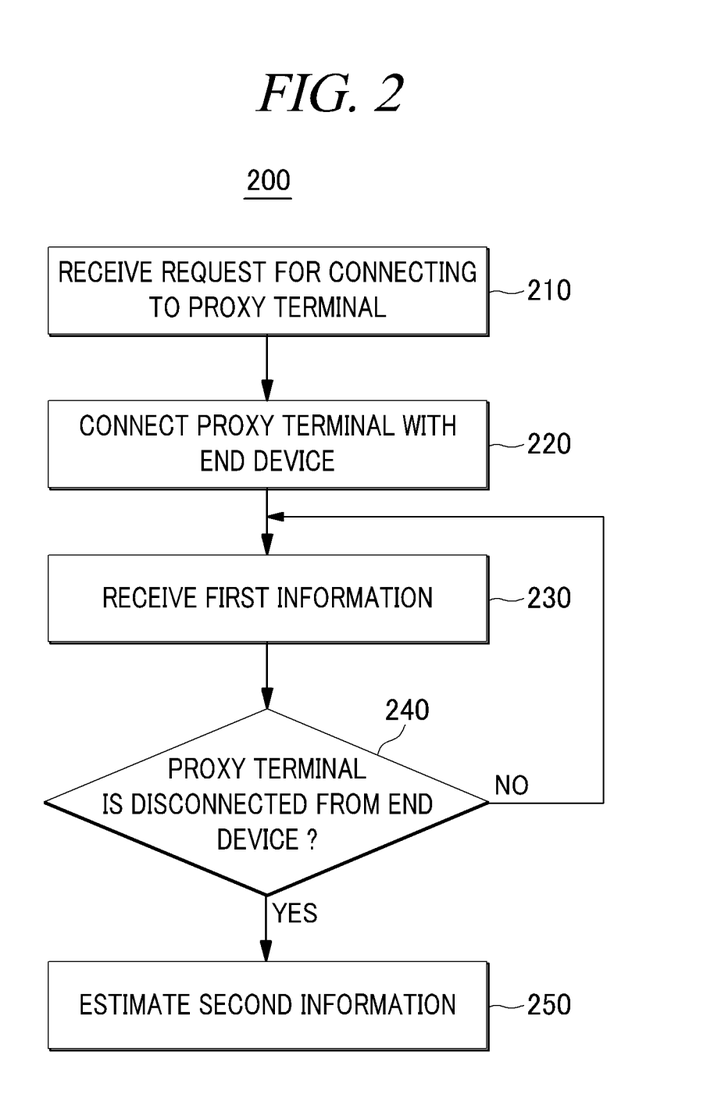
FIG. 2 shows an example flow diagram of a process of a cloud system for estimating missed device information, arranged in accordance with at least some embodiments described herein.

FIG. 2 shows an example flow diagram of a process 200 of cloud system 120 for estimating missed device information, arranged in accordance with at least some embodiments described herein. The method in FIG. 2 may be implemented in network communication environment 100 including network provider 110, cloud system 120 including proxy terminals 121, 122, 123, first end device 130, second end device 140 and third end device 150, as illustrated in FIGS. 1A and 1B. An example process may include one or more operations, actions, or functions as illustrated by one or more blocks 210, 220, 230, 240 and/or 250. Although illustrated as discrete blocks, various blocks may be divided into additional blocks, combined into fewer blocks, or eliminated, depending on the desired implementation. Processing may begin at block 210.

At block 210 (Receive Request for Connecting to Proxy Terminal), cloud system 120 may receive, from an end device, a request for connecting to a proxy terminal included in cloud system 120. In some embodiments, first proxy terminal 121 may receive a request for connecting to first proxy terminal 121 from first end device 130 and second proxy terminal 122 may receive a request for connecting to second proxy terminal 122 from second end device 140. Processing may proceed from block 210 to block 220.

At block 220 (Connect Proxy terminal with End Device), cloud system 120 may connect the proxy terminal with the end device from which the connecting request is received at block 210. In some embodiments, first proxy terminal 121 may connect to first end device 130 and second proxy terminal 122 may connect to second end device 140. There may be a one-to-one correspondence between each of first end device 130 and second end device 140 and each of first proxy terminal 121 and second proxy terminal 122. Processing may proceed from block 220 to block 230.

At block 230 (Receive First Information), cloud system 120 may receive, from the end device connected to the proxy terminal, first information regarding the end device. By way of example, but not limitation, the first information regarding the end device may include at least one of a global positioning system (GPS) information of the end device, a network usage information of the end device and a device usage information of the end device. Further, the network usage information of the end device may include Uniform Resource Locator (URL) or Internet Protocol (IP) address of a website to which the end device accesses, and Internet Protocol (IP) address of another end device with which the end device communicates through a network. By way of example, but not limitation, the device usage information of the end device may include an acceleration sensor data of the end device, liquid crystal brightness values of the end device, and camera usage record of the end device.

In some embodiments, first proxy terminal 121 may receive first information regarding first end device 130 from first end device 130 and second proxy terminal 122 may receive first information regarding second end device 140 from second end device 140. Further, first proxy terminal 121 may store the received first information regarding first end device 130 in a database of first proxy terminal 121 and second proxy terminal 122 may store the received first information regarding second end device 140 in a database of second proxy terminal 122. Processing may proceed from block 230 to block 240.

At block 240 (Determine whether Proxy Terminal is Disconnected from End Device), cloud system 120 may determine whether the proxy terminal is disconnected from the end device. In some embodiments, if first end device 130 moves out of connecting area 125 of cloud system 120, first end device 130 may be disconnected from first proxy terminal 121 included in cloud system 120.

If cloud system 120 determines at block 240 that the proxy terminal is disconnected from the end device, processing may proceed to block 250, while if cloud system 120 determines at block 240 that the proxy terminal keeps connecting to the end device, processing may proceed to block 230.

At block 250 (Estimate Second Information), cloud system 120 may estimate second information regarding the end device. If the proxy terminal included in cloud system 120 is disconnected from the end device, cloud system 120 may not receive information regarding the end device and thus, cloud system 120 may miss the information regarding the end device during the disconnection. In such cases, cloud system 120 may estimate the second information (i.e. the missed first information) regarding the end device based on the first information received at block 230.

In some embodiments, if first proxy terminal 121 is disconnected from first end device 130, first proxy terminal 121 may estimate the second information regarding first end device 130 based on the first information regarding first end device 130. In some other embodiments, first proxy terminal 121 may estimate the second information regarding first end device 130 based on the first information regarding first end device 130 and the first information regarding second end device 140. In such cases, first proxy terminal 121 may obtain the first information regarding second end device 140 from second proxy terminal 122.

Figure 3:
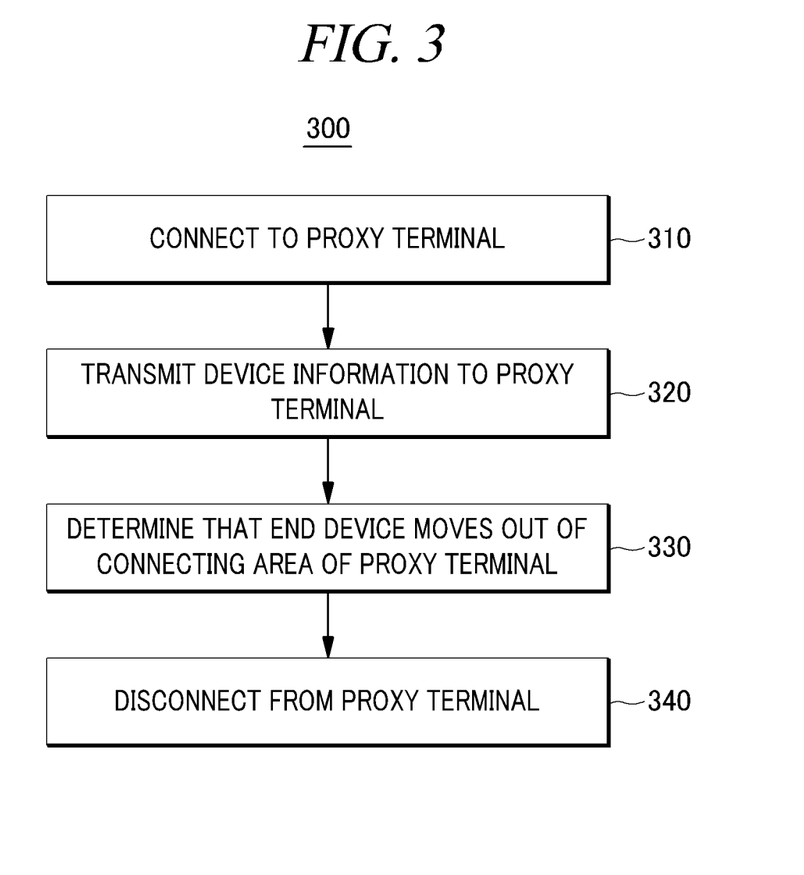
FIG. 3 shows an example flow diagram of a process of an end device for transmitting device information, arranged in accordance with at least some embodiments described herein.

FIG. 3 shows an example flow diagram of a process 300 of an end device for transmitting device information, arranged in accordance with at least some embodiments described herein. The method in FIG. 3 may be implemented in network communication environment 100 including network provider 110, cloud system 120 including proxy terminals 121, 122, 123, first end device 130, second end device 140 and third end device 150, as illustrated in FIGS. 1A and 1B. An example process may include one or more operations, actions, or functions as illustrated by one or more blocks 310, 320, 330 and/or 340. Although illustrated as discrete blocks, various blocks may be divided into additional blocks, combined into fewer blocks, or eliminated, depending on the desired implementation. Processing may begin at block 310.

At block 310 (Connect to Proxy Terminal), an end device may transmit, to a proxy terminal included in cloud system 120, a request for connecting to the proxy terminal and then, the end device may connect to the proxy terminal. In some embodiments, first end device 130 may transmit, to first proxy terminal 121, a request for connecting to first proxy terminal 121 and connect to first proxy terminal 121. Further, second end device 140 may transmit, to second proxy terminal 122, a request for connecting to second proxy terminal 122 and connect to second proxy terminal 122. Processing may proceed from block 310 to block 320.

At block 320 (Transmit Device Information to Proxy Terminal), the end device may transmit device information regarding the end device to the proxy terminal while the end device is being connected to the proxy terminal. By way of example, but not limitation, the device information regarding the end device may include at least one of a global positioning system (GPS) information of the end device, a network usage information of the end device and a device usage information of the end device. Further, the network usage information of the end device may include Uniform Resource Locator (URL) or Internet Protocol (IP) address of a website to which the end device accesses, and Internet Protocol (IP) address of other end device with which the end device communicates through a network. By way of example, but not limitation, the device usage information of the end device may include an acceleration sensor data of the end device, liquid crystal brightness values of the end device, and camera usage record of the end device.

In some embodiments, first end device 130 may transmit device information regarding first end device 130 to first proxy terminal 121 included in cloud system 120 while first end device 130 is being connected to first proxy terminal 121. By way of example, but not limitation, first end device 130 may transmit, to first proxy terminal 121, at least one of a global positioning system (GPS) information of first end device 130, Uniform Resource Locator (URL) or Internet Protocol (IP) address of a website to which first end device 130 accesses, Internet Protocol (IP) address of other end device with which first end device 130 communicates through a network, acceleration sensor data of first end device 130, liquid crystal brightness values of first end device 130 or camera usage record of first end device 130.

Further, second end device 140 may transmit device information regarding second end device 140 to second proxy terminal 122 included in cloud system 120 while second end device 140 is being connected to second proxy terminal 122. By way of example, but not limitation, second end device 140 may transmit, to second proxy terminal 122, at least one of a global positioning system (GPS) information of second end device 140, Uniform Resource Locator (URL) or Internet Protocol (IP) address of a website to which second end device 140 accesses, Internet Protocol (IP) address of other end device with which second end device 140 communicates through a network, acceleration sensor data of second end device 140, liquid crystal brightness values of second end device 140 or camera usage record of second end device 140. Processing may proceed from block 320 to block 330.

At block 330 (Determine that End Device moves out of Connecting Area of Proxy Terminal), the end device may determine that it moves out of a connecting area of the proxy terminal. In some embodiments, first end device 130 may move out of connecting area 125 of cloud system 120 and determine that it moves out of connecting area 125 of cloud system 120. Processing may proceed from block 330 to block 340.

At block 340 (Disconnect from Proxy Terminal), the end device that moves out of the connecting area of the proxy terminal at block 330 may be disconnected from the proxy terminal. If the end device is disconnected from the proxy terminal, the end device may not transmit the device information to the proxy terminal, and thus the proxy terminal misses the device information. In such cases, the proxy terminal may estimate the missed device information based on the device information previously received at block 320.

By way of example, but not limitation, if first end device 130 is disconnected from first proxy terminal 121, first proxy terminal 121 may miss the present global positioning system (GPS) information of first end device 130. Then, first proxy terminal 121 may predict the present location of first end device 130 and estimate the missed present GPS information of first end device 130 based on the previously received GPS information of first end device 130.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
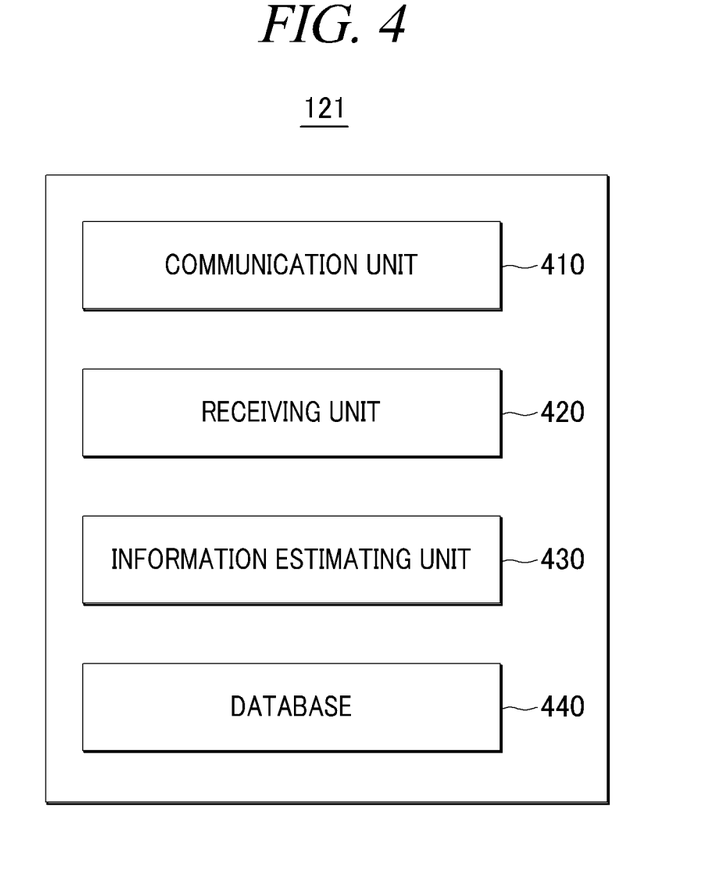
FIG. 4 shows a schematic block diagram illustrating an example architecture for a first proxy terminal, arranged in accordance with at least some embodiments described herein.

FIG. 4 shows a schematic block diagram illustrating an example architecture for a first proxy terminal 121, arranged in accordance with at least some embodiments described herein. As depicted in FIG. 4, first proxy terminal 121 may include a communication unit 410, a receiving unit 420, an information estimating unit 430 and a database 440. Similarly, second proxy terminal 122 and third proxy terminal may include the same or similar components of communication unit 410, a receiving unit 420, an information estimating unit 430 and a database 440, respectively. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of communication unit 410, receiving unit 420, information estimating unit 430 and database 440 may be included in an instance of an application hosted on first proxy terminal 121.

Communication unit 410 may be configured to connect to first end device 130. By way of example, but not limitation, communication unit 410 may connect to first end device 130 via a wireless local area network such a Wi-Fi network. Further, communication unit 410 may be configured to connect to a communication network, so that first end device 130 may be connected to the communication network through communication unit 410. By way of example, but not limitation, the network may include an Internet, a wireless local area network such as a Wi-Fi network or a mobile telecommunications network including a 3rd generation (3G) mobile telecommunications network, a 4th generation (4G) mobile telecommunications network, and any other mobile telecommunications networks.

Receiving unit 420 may be configured to receive, from first end device 130, a request for connecting to proxy terminal 121. Upon receiving the request from receiving unit 420, communication unit 410 may connect to first end device 130. Further, receiving unit 420 may be configured to receive, from first end device 130, first information regarding first end device 130. By way of example, but not limitation, the first information regarding first end device 130 may include at least one of a global positioning system (GPS) information of first end device 130, a network usage information of first end device 130 and a device usage information of first end device 130. Further, the network usage information of first end device 130 may include Uniform Resource Locator (URL) or Internet Protocol (IP) address of a website to which first end device 130 accesses, and Internet Protocol (IP) address of other end device with which first end device 130 communicates through a network. By way of example, but not limitation, the device usage information of first end device 130 may include an acceleration sensor data of first end device 130, liquid crystal brightness values of first end device 130, and camera usage record of first end device 130.

Information estimating unit 430 may be configured to estimate second information regarding first end device 130 based on the first information regarding first end device 130 when first end device 130 is disconnected from proxy terminal 121. If proxy terminal 121 is disconnected from first end device 130, receiving unit 420 may not receive the information regarding first end device 130 and miss it. In such cases, information estimating unit 430 may estimate the missed information (i.e., second information) based on the first information received by receiving unit 420.

Database 440 may be configured to store the first information regarding first end device 130 received by receiving unit 420. Further, database 440 may be configured to store the second information regarding first end device 130 estimated by information estimating unit 430.

Figure 5:
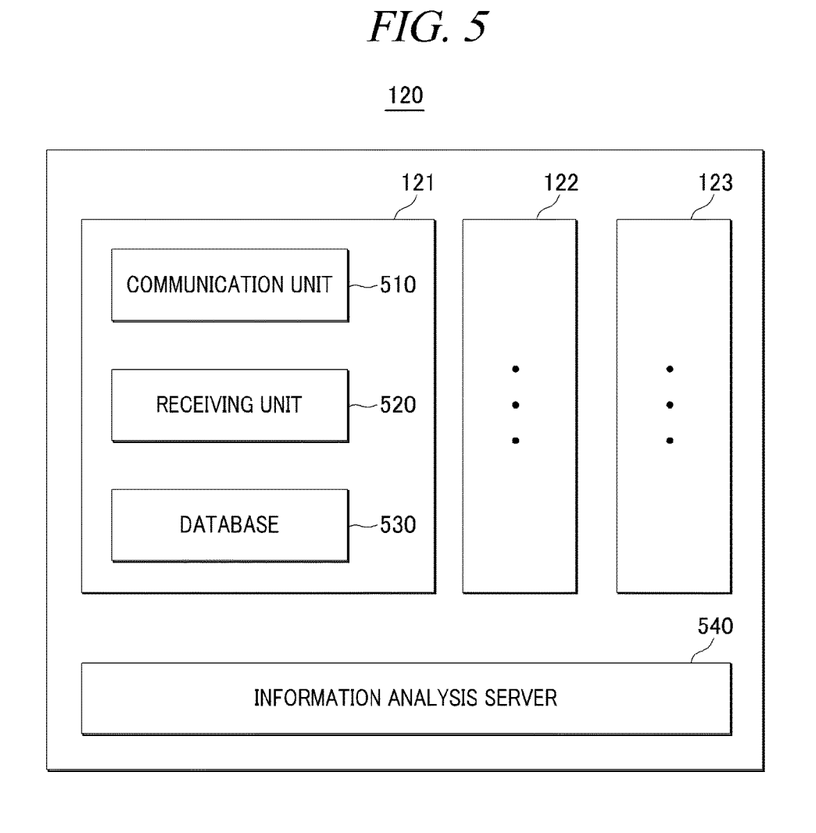
FIG. 5 shows a schematic block diagram illustrating an example architecture for a cloud system, arranged in accordance with at least some embodiments described herein.

FIG. 5 shows a schematic block diagram illustrating an example architecture for a cloud system 120, arranged in accordance with at least some embodiments described herein. As depicted in FIG. 5, cloud system 120 may include first proxy terminal 121, second proxy terminal 122, third proxy terminal 123, and information analysis server 540. Further, first proxy terminal 121 may include a communication unit 510, a receiving unit 520 and a database 530. Similarly, second proxy terminal 122 and third proxy terminal 123 may include the same of similar components of communication unit 510, receiving unit 520 and database 530, respectively. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of first proxy terminal 121, second proxy terminal 122, third proxy terminal 123, and information analysis server 540 may be included in an instance of an application hosted on cloud system 120. Further, one or more of communication unit 510, receiving unit 520, and database 530 may be included in an instance of an application hosted on proxy terminal 121.

Communication unit 510 may be configured to connect to first end device 130. By way of example, but not limitation, communication unit 510 may connect to first end device 130 via a wireless local area network such a Wi-Fi network. Further, communication unit 510 may be configured to connect to network, so first end device 130 may be connected to the network through communication unit 510. By way of example, but not limitation, the network may include an Internet, a wireless local area network such as a Wi-Fi network or a mobile telecommunications network including a 3rd generation (3G) mobile telecommunications network, a 4th generation (4G) mobile telecommunications network, and any other mobile telecommunications networks.

Receiving unit 520 may be configured to receive, from first end device 130, a request for connecting to proxy terminal 121. Upon receiving the request from receiving unit 520, communication unit 510 may connect to first end device 130. Further, receiving unit 520 may be configured to receive, from first end device 130, first information regarding first end device 130. By way of example, but not limitation, the first information regarding first end device 130 may include at least one of a global positioning system (GPS) information of first end device 130, a network usage information of first end device 130 and a device usage information of first end device 130. Further, the network usage information of first end device 130 may include Uniform Resource Locator (URL) or Internet Protocol (IP) address of a website to which first end device 130 accesses, and Internet Protocol (IP) address of other end device with which first end device 130 communicates through a network. By way of example, but not limitation, the device usage information of first end device 130 may include an acceleration sensor data of first end device 130, liquid crystal brightness values of first end device 130, and camera usage record of first end device 130.

Database 530 may be configured to store the first information regarding first end device 130 received by receiving unit 520. Further, database 530 may be configured to store second information regarding first end device 130 estimated by information analysis server 540 as described below.

Information analysis server 540 may be configured to estimate the second information regarding first end device 130 based on the first information regarding first end device 130 when first end device 130 is disconnected from proxy terminal 121. When proxy terminal 121 is disconnected from first end device 130, receiving unit 520 may not receive the information regarding first end device 130 and miss the information. In such cases, information analysis server 540 may estimate the missed information (i.e., second information) based on the first information received by receiving unit 520.

Figure 6:
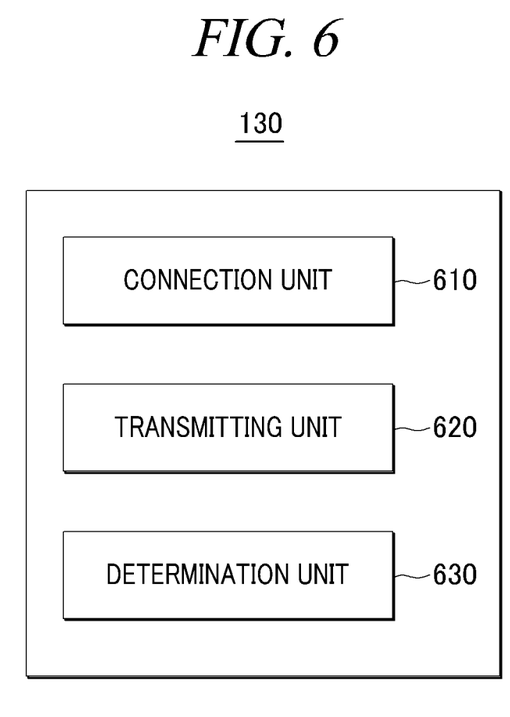
FIG. 6 shows a schematic block diagram illustrating an example architecture for a first end device, arranged in accordance with at least some embodiments described herein.

FIG. 6 shows a schematic block diagram illustrating an example architecture for a first end device 130, arranged in accordance with at least some embodiments described herein. As depicted in FIG. 6, first end device 130 may include a connection unit 610, a transmitting unit 620, and a determination unit 630. Similarly, second end device 140 and third end device 150 may include the same of similar components of connection unit 610, transmitting unit 620, and determination unit 630, respectively. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of connection unit 610, transmitting unit 620, and determination unit 630 may be included in an instance of an application hosted on first end device 130.

Connection unit 610 may be configured to connect to first proxy terminal 121 via a network such as a Wi-Fi network.

Transmitting unit 620 may be configured to transmit, to first proxy terminal 121, a request for connecting to first proxy terminal 121. Further, transmitting unit 620 may be configured to transmit device information regarding first end device 130 while first end device 130 is being connecting to first proxy terminal 121. By way of example, but not limitation, the device information regarding first end device 130 may include at least one of a global positioning system (GPS) information of first end device 130, a network usage information of first end device 130 and a device usage information of first end device 130. Further, the network usage information of first end device 130 may include Uniform Resource Locator (URL) or Internet Protocol (IP) address of a website to which first end device 130 accesses, and Internet Protocol (IP) address of other end device with which first end device 130 communicates through a network. Further, for example, the device usage information of first end device 130 may include an acceleration sensor data of first end device 130, liquid crystal brightness values of first end device 130, and camera usage record of first end device 130.

Determination unit 630 may be configured to determine that first end device 130 moves out of connecting area 125 of first proxy terminal 121. If determination unit 630 determines that first end device 130 moves out of connecting area 125 of first proxy terminal 121, connection unit 610 may disconnect from first proxy terminal 121.

In such cases that connection unit 610 is disconnected from first proxy terminal 121, transmitting unit 620 may not transmit the device information to first proxy terminal 121, and thus first proxy terminal 121 may miss the device information. Then, first proxy terminal 121 may estimate the missed device information based on the device information previously transmitted by transmitting unit 620.

Figure 7:
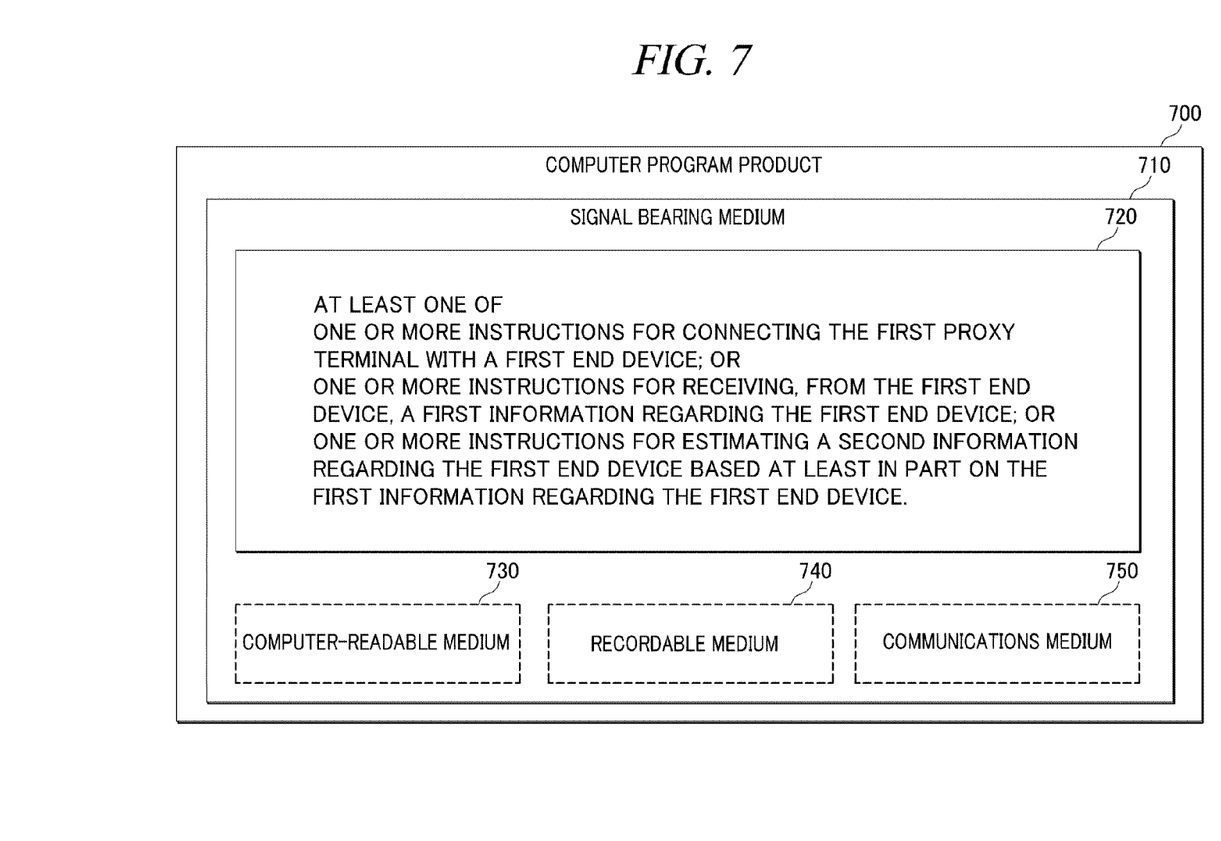
FIG. 7 illustrates computer program products that may be utilized to provide a scheme for estimating missed information, arranged in accordance with at least some embodiments described herein.

FIG. 7 illustrates computer program products that may be utilized to provide a scheme for estimating missed information, arranged in accordance with at least some embodiments described herein. Program product 700 may include a signal bearing medium 710. Signal bearing medium 710 may include one or more instructions 720 that, when executed by, for example, a processor, may provide the functionality described above with respect to FIGS. 1-6. By way of example, but not limitation, instructions 720 may include: one or more instructions for connecting the first proxy terminal with a first end device; one or more instructions for receiving, from the first end device, a first information regarding the first end device; and one or more instructions for estimating a second information regarding the first end device based at least in part on the first information regarding the first end device. The estimating is performed when the first end device is disconnected from the first proxy terminal. Thus, for example, referring to FIG. 2, cloud system 120 may undertake one or more of the blocks shown in FIG. 2 in response to instructions 720.

By way of example, but not limitation, instructions 720 may include: one or more instructions connecting to a proxy terminal included in a cloud system; one or more instructions for transmitting a device information to the proxy terminal while connecting to the proxy terminal; one or more instruction for determining whether the end device moves out of a connection area of the proxy terminal; and one or more instructions for disconnecting from the proxy terminal if the end device moves out of the connection area of the proxy terminal. The device information may include at least one of a global positioning system (GPS) information of the end device, a network usage information of the end device and a device usage information of the end device. Thus, for example, referring to FIG. 3, first end device 130 may undertake one or more of the blocks shown in FIG. 3 in response to instructions 720.

In some implementations, signal bearing medium 710 may encompass a computer-readable medium 730, such as, but not limited to, a hard disk drive, a CD, a DVD, a digital tape, memory, etc. In some implementations, signal bearing medium 710 may encompass a recordable medium 740, such as, but not limited to, memory, read/write (R/W) CDs, R/W DVDs, etc. In some implementations, signal bearing medium 710 may encompass a communications medium 750, such as, but not limited to, a digital and/or an analog communication medium (e.g., a fiber optic cable, a waveguide, a wired communications link, a wireless communication link, etc.). Thus, for example, program product 700 may be conveyed to one or more modules of cloud system 120 by an RF signal bearing medium 710, where the signal bearing medium 710 is conveyed by a wireless communications medium 750 (e.g., a wireless communications medium conforming with the IEEE 802.11 standard).

Figure 8:
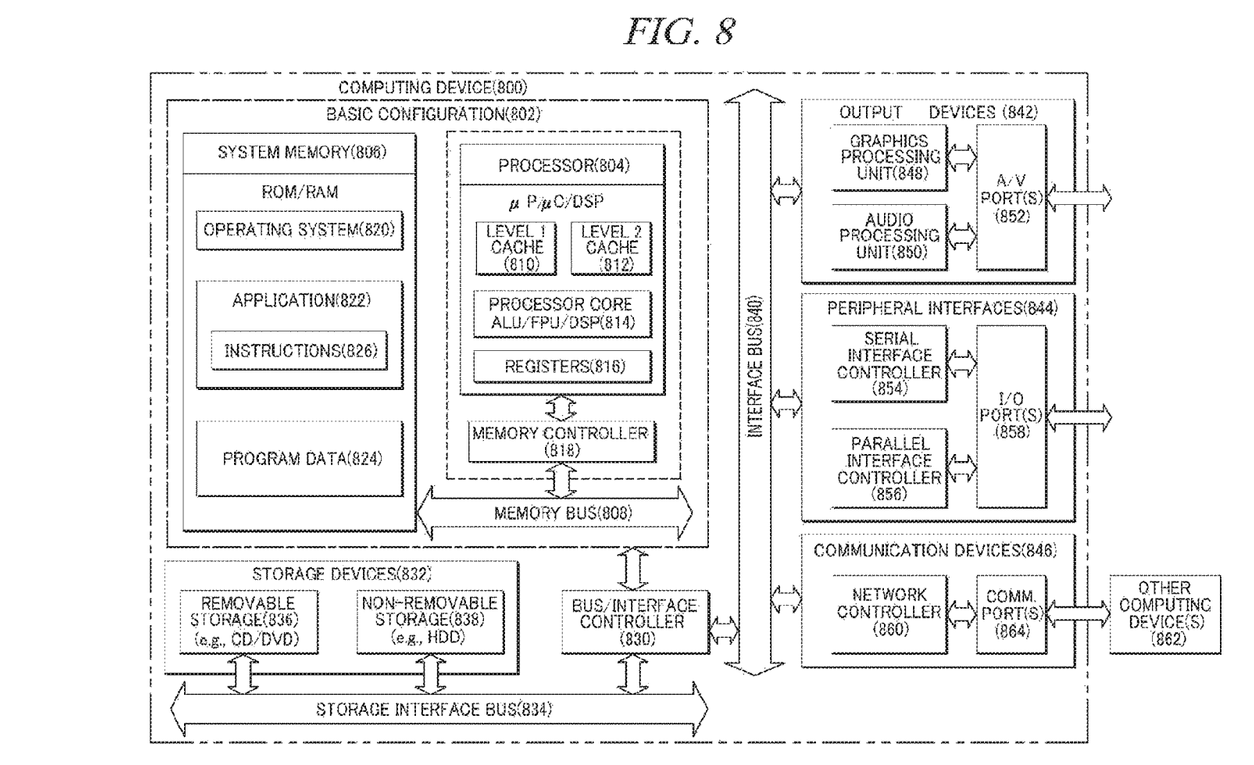
FIG. 8 is a block diagram illustrating an example computing device that may be utilized to provide a scheme for estimating missed information, arranged in accordance with at least some embodiments described herein.

FIG. 8 is a block diagram illustrating an example computing device that may be utilized to provide a scheme for estimating missed information, arranged in accordance with at least some embodiments described herein. In these examples, elements of computing device 800 may be arranged or configured for a device. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, an application 822, and program data 824. Application 822 may include instructions 826 that may be arranged to perform the functions as described herein including the actions described with respect to cloud system 120 architecture as shown in FIG. 4 or including the actions described with respect to the flow charts shown in FIG. 2. In some examples, application 822 may be arranged to operate with program data 824 on an operating system 820 such that the schemes for estimating missed information as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a cloud computing system that includes a first proxy terminal and a second proxy terminal, the method comprising:
   connecting the first proxy terminal with a first end device;
   connecting the second proxy terminal with a second end device;
   receiving, by the cloud computing system, from the first end device, first information regarding the first end device;
   responsive to a determination that the first end device is disconnected from the first proxy terminal, estimating second information, by the cloud computing system, regarding the first end device based, at least in part, on the first information regarding the first end device,
   wherein the second information includes information regarding the first end device missed while the first end device is disconnected from the first proxy terminal, and
   wherein both the first information regarding the first end device and the second information regarding the first end device include at least one of global positioning system (GPS) information of the first end device, network usage information of the first end device, and device usage information of the first end device;

receiving, by the cloud computing system, from the second end device, first information regarding the second end device; and estimating, by the cloud computing system, second information regarding the second end device based, at least in part, on:
the first information regarding the second end device after disconnection of the second end device from the second proxy terminal, and
the first information regarding the first end device.

2. The method of claim 1, further comprising:
receiving from the first end device, a request to connect to the first proxy terminal.

3. The method of claim 1, further comprising:
storing the first information regarding the first end device and the second information regarding the first end device in a database of the first proxy terminal.

4. The method of claim 1, wherein the cloud computing system is connected to a network, and wherein the first end device is connected to the network through the first proxy terminal.

5. The method of claim 4, wherein the network includes an Internet.

6. A proxy terminal included in a cloud computing system, the proxy terminal comprising:
a processor, in communication with a memory that stores instructions, configured to execute the instructions to provide:
a communication unit configured to connect to an end device;
a receiver unit configured to receive, from the end device, first information regarding the end device; and
an information estimation unit configured to, responsive to a determination that the end device is disconnected from the proxy terminal, estimate second information regarding the end device based, at least in part, on:
the first information regarding the end device, and
information regarding another end device that is connected to another proxy terminal included in the cloud computing system,
wherein the second information regarding the end device includes information regarding the end device missed while the end device is disconnected from the proxy terminal, and
wherein both of the first information regarding the end device and the second information regarding the end device include at least one of global positioning system (GPS) information of the end device, network usage information of the end device, and device usage information of the end device; and
a database configured to store the first information regarding the end device and the second information regarding the end device.

7. The proxy terminal of claim 6, wherein the cloud computing system further includes an information analysis server that is configured to estimate the second information regarding the end device based, at least in part, on the first information regarding the end device after disconnection of the end device from the proxy terminal.

8. The proxy terminal of claim 7, wherein the information analysis server is further configured to estimate the second information regarding the end device based, at least in part, on the information regarding the other end device that is connected to the other proxy terminal included in the cloud computing system.

9. The proxy terminal of claim 6, wherein the receiver unit is further configured to receive, from the end device, a request to connect to the proxy terminal.

10. The proxy terminal of claim 6, wherein the communication unit is further configured to connect to a network, and wherein the end device is connected to the network through the communication unit of the proxy terminal.

11. The proxy terminal of claim 10, wherein the network includes an Internet.

12. A non-transitory computer-readable storage medium having stored thereon computer-executable instructions that, in response to execution, cause a cloud computing system, that includes a first proxy terminal and a second proxy terminal, to perform or control performance of operations to:
connect the first proxy terminal with a first end device;
connect the second proxy terminal with a second end device;
obtain, by the cloud computing system, from the first end device, first information regarding the first end device;
responsive to a determination that the first end device is disconnected from the first proxy terminal, estimate second information, by the cloud computing system, regarding the first end device based, at least in part, on the first information regarding the first end device,
wherein the second information includes information regarding the first end device missed while the first end device is disconnected from the first proxy terminal, and
wherein both the first information regarding the first end device and the second information regarding the first end device include at least one of global positioning system (GPS) information of the first end device, network usage information of the first end device, and device usage information of the first end device;
obtain by the cloud computing system, from the second end device, first information regarding the second end device; and
estimate, by the cloud computing system, second information regarding the second end device based, at least in part, on:
the first information regarding the second end device after disconnection of the second end device from the second proxy terminal, and
the first information regarding the first end device.

13. The non-transitory computer-readable storage medium of claim 12, wherein the cloud computing system is connected to a network, and wherein the first end device is connected to the network through the first proxy terminal.

14. The method of claim 1, wherein the network usage information of the first end device includes uniform resource locator (URL) or internet protocol (IP) address of a website accessed by the first end device, or IP address of another end device with which the first end device communicates through a network.

15. The method of claim 1, wherein the device usage information of the first end device includes an acceleration sensor data of the first end device, liquid crystal brightness values of the first end device, and camera usage record of the first end device.

* * * * *